Figure 9:
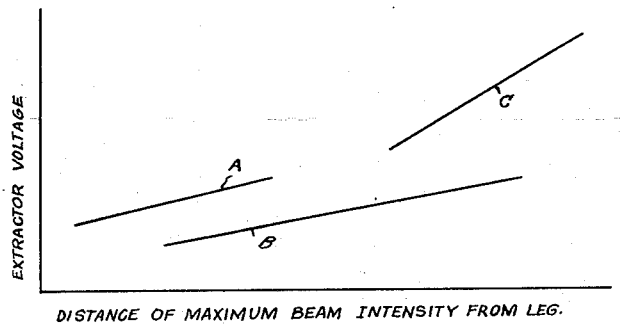

June 2, 1953  H. C. POLLOCK  2,640,923
SYSTEM AND APPARATUS FOR OBTAINING A BEAM OF HIGH ENERGY
ELECTRONS FROM CHARGED PARTICLE ACCELERATORS
Filed March 31, 1950  4 Sheets-Sheet 1
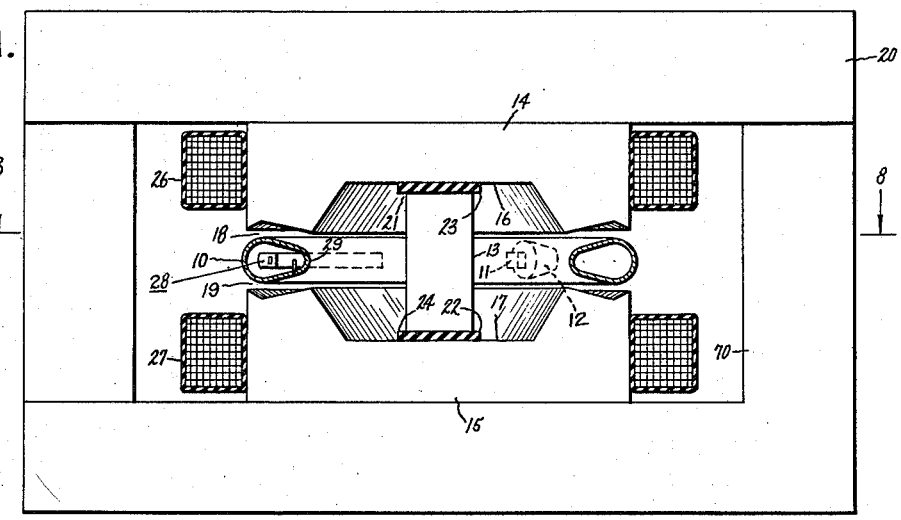
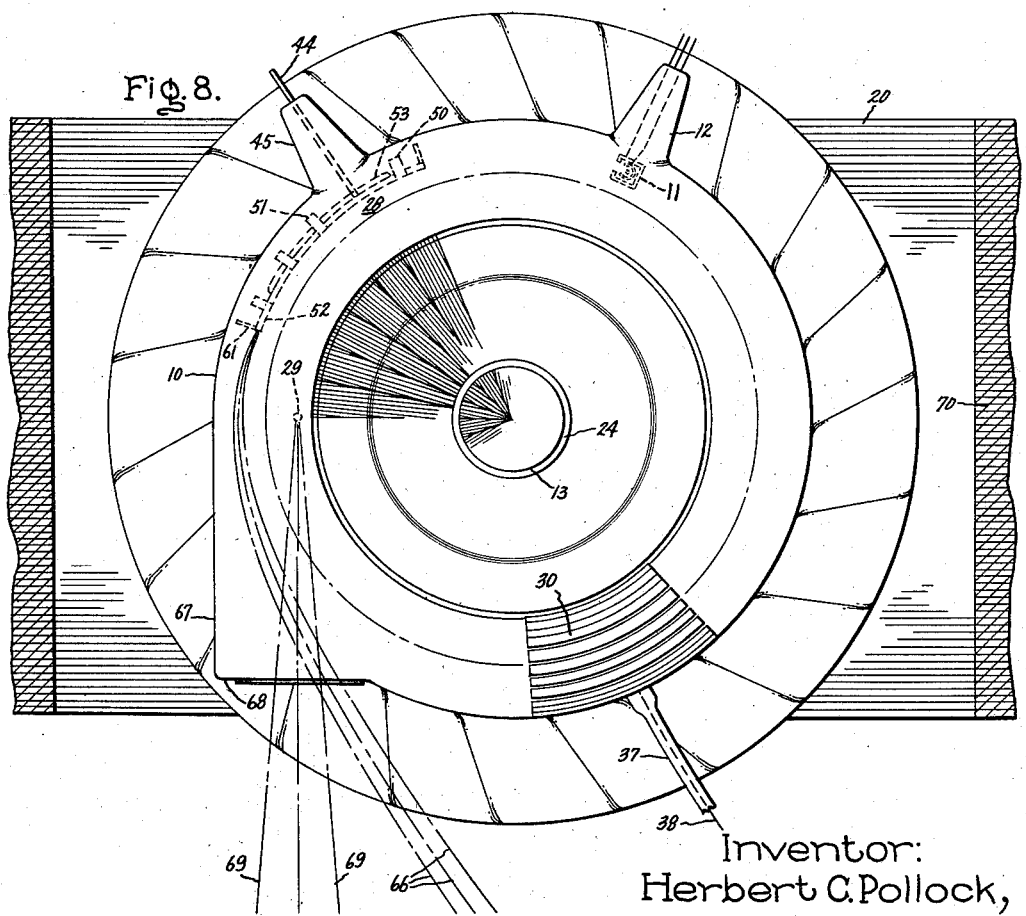
Inventor:
Herbert C. Pollock,
by Paul A. Frank
His Attorney.

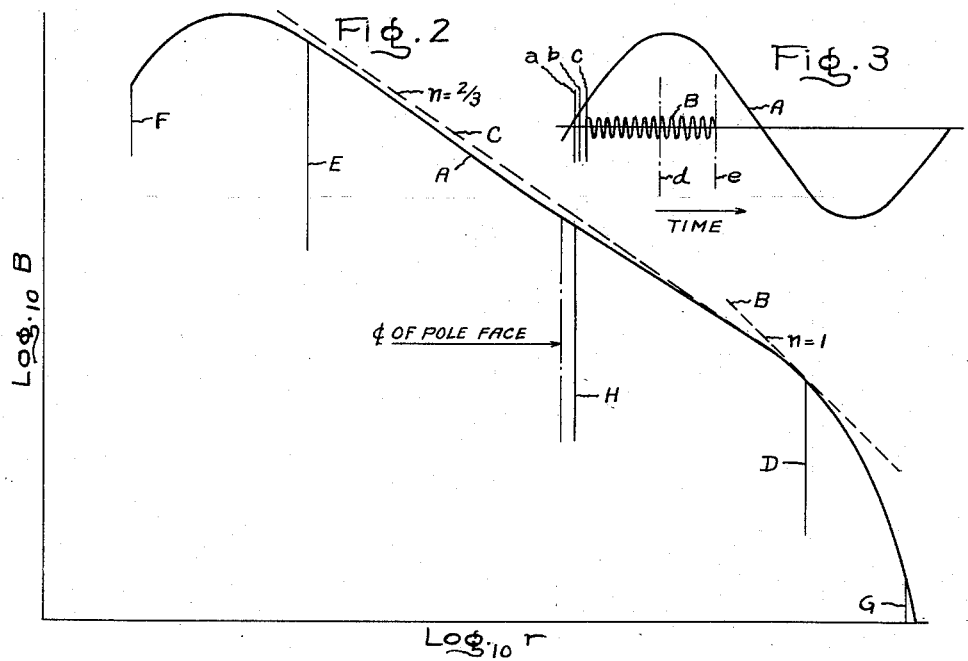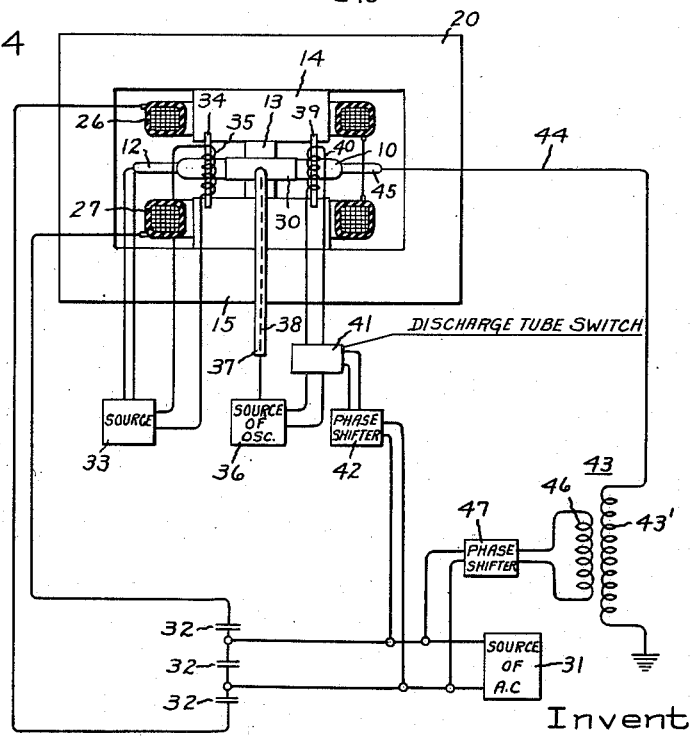

June 2, 1953   H. C. POLLOCK   2,640,923
SYSTEM AND APPARATUS FOR OBTAINING A BEAM OF HIGH ENERGY
ELECTRONS FROM CHARGED PARTICLE ACCELERATORS
Filed March 31, 1950   4 Sheets-Sheet 3
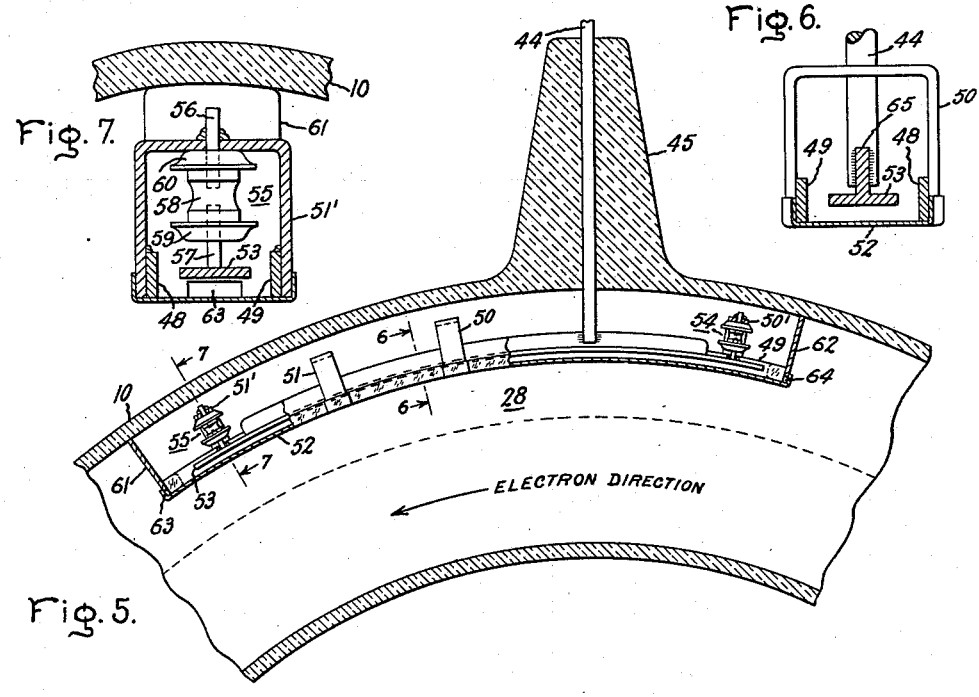
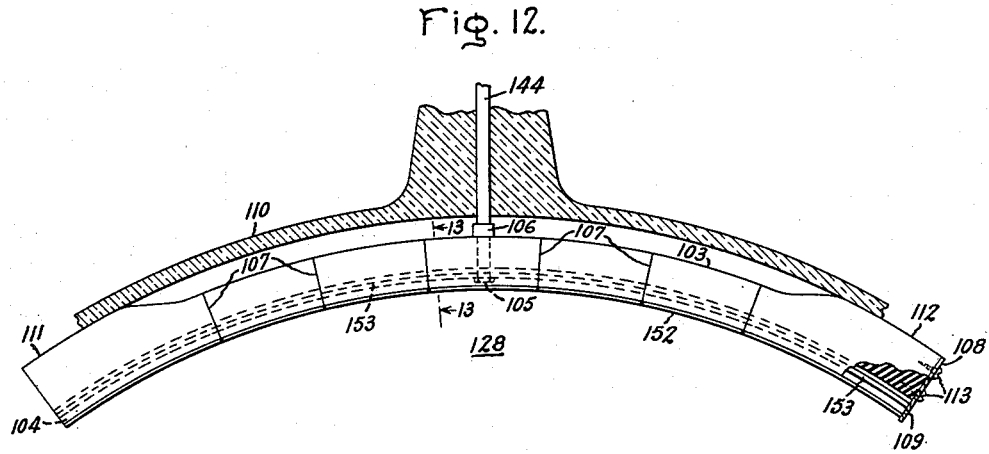
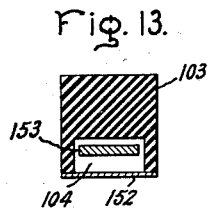
Inventor:
Herbert C. Pollock,
by Paul A. Frank
His Attorney.

Inventor:
Herbert C. Pollock,
by Paul A. Frank
His Attorney.

Patented June 2, 1953

2,640,923

UNITED STATES PATENT OFFICE 2,640,923

SYSTEM AND APPARATUS FOR OBTAINING A BEAM OF HIGH ENERGY ELECTRONS FROM CHARGED PARTICLE ACCELERATORS

Herbert C. Pollock, Schenectady, N. Y., assignor to General Electric Company, a corporation of New York Application March 31, 1950, Serial No. 153,241

10 Claims. (Cl. 250—27)

1

The present invention relates to systems, and apparatus for obtaining a beam of high energy electrons from a charged particle accelerator.

It is known that high energy may be imparted to charged particles such as electrons by accelerating the particles in an orbital path. Practical and highly efficient apparatus for accomplishing such a result is disclosed in U. S. Patent 2,485,409, granted October 18, 1949, to Herbert C. Pollock and Willem F. Westendorp, and assigned to the assignee of this present invention. This apparatus comprises means for initially accelerating charged particles, usually electrons, in an oribital path by the action of a time-varying magnetic flux which links the orbital path to accelerate the electrons and a time-varying magnetic guide field which traverses the path to constrain the electrons thereto. After the electrons have reached a velocity near that of light, additional energy is imparted to them by a localized electric field of cyclically varying character. With such apparatus, it is possible to obtain electron energy levels of several hundred million electron volts.

Although such apparatus as that described in the above-mentioned patent has been outstandingly successful in the acceleration of electrons to high energy levels in an orbital path, additional apparatus is desirable to facilitate the direct utilization of the high energy electrons. Commonly, the energy of the accelerated electrons is utilized by causing the electrons to impinge upon a suitable target within the accelerator apparatus whereby X-rays of correspondingly high intensity, which may be directed from the accelerator apparatus for suitable application, will be generated. For some applications, however, it is desirable to extract the electrons themselves from the accelerator apparatus, rather than employing them first to generate X-rays before beneficial use is realized. Accordingly, a principal object of the present invention is to provide systems and apparatus for the practical and efficient production of high energy electron beams which may be utilized external to the accelerator apparatus.

One aspect of the invention exemplary of the principles thereof more fully described and defined hereinafter comprises injecting electrons into an orbital path enclosed by an evacuated annular vessel, initially accelerating the electrons in the orbital path by the action of a time-varying magnetic flux which links the path to accelerate the electrons and a time-varying magnetic guide field which traverses the path to constrain the electrons thereto, imparting additional energy to the electrons by coupling a cyclically varying

2 electric field to the electrons within the orbital path, diverting the electrons from the orbital path into spiral paths after a desired energy level has been obtained, increasing the pitch of the spiral paths followed by the electrons by causing the electrons to traverse a second electric field, the intensity of which is proportional in time to the intensity of the aforesaid magnetic guide field, and ejecting the electrons in a beam from the evacuated vessel by directing them through an electron permeable window in the vessel.

Figure 10:
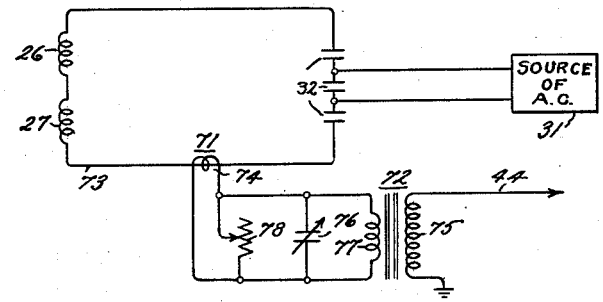
Figure 11:
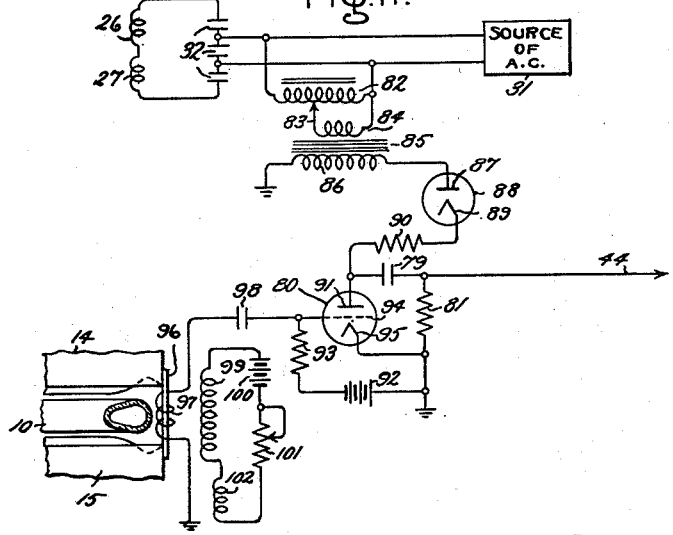

The features of the invention desired to be protected herein are pointed out with particularity in the appended claims. The invention itself, together with further objects and advantages thereof, may best be understood by reference to the following description taken in connection with the following accompanying drawings in which Fig. 1 is a partially sectionalized elevation of accelerator apparatus suitably embodying the invention; Fig. 2 is a graphical representation helpful in explaining the invention; Fig. 3 is a second graphical representation useful in explaining the invention; Fig. 4 is a schematic representation of excitation equipment useful in connection with the device of Fig. 1; Fig. 5 is an enlarged detail view of one portion of the elevation of Fig. 1; Fig. 6 is a cross section taken on line 6—6 of Fig. 5; Fig. 7 is a cross section taken on line 7—7 of Fig. 5; Fig. 8 is a schematic representation showing the location of elements within the accelerator apparatus of the invention; Fig. 9 is a third graphical representation useful in explaining the invention; Fig. 10 is a schematic representation of alternative circuitry which may be employed in connection with the excitation equipment represented in Fig. 4; Fig. 11 is a schematic representation of other alternative circuitry which may be employed in connection with the excitation equipment represented in Fig. 4; Fig. 12 is an elevation of structure which may be employed in connection with the invention as an alternative to that shown in Fig. 5; and Fig. 13 is a cross section taken on line 13—13 of Fig. 12.

Referring particularly to Fig. 1, there is shown in section a closed, rotationally symmetrical envelope 10, of suitable dielectric material such as glass or porcelain, which defines within its interior an annular chamber. The envelope 10 provides a circular orbit in which electrons derived from a suitably energized source 11 supported from a side arm 12 may be accelerated to a high energy level. The envelope 10 is preferably highly evacuated and is provided on its interior surface with a conductive coating, e. g., a layer of a metallic salt, in order to reduce the effect of wall charging.

The envelope or vessel 10 lies symmetrically around the axis of a laminated magnetic structure having a central flux path provided by a laminated annular core 13. This core is supported at its extremities by attachment to the central portions of opposed pole pieces 14 and 15 which have circular areas 16 and 17 and tapered annular areas or pole faces 18 and 19. These pole pieces are, in turn, supported by a rectangular frame 20 of laminated iron which surrounds and extends transversely to envelope 10.

The ends of core 13 are separated from pole pieces 14 and 15 by narrow gaps 21 and 22, filling which are disc-shaped elements 23 and 24 of nonmagnetic, insulating material. Gaps 21 and 22 are so proportioned as to cause core 13 to saturate at a predetermined level of the magnetic flux passing through it. The annular faces 18 and 19 of pole pieces 14 and 15 each have a double taper as shown, the purpose of this configuration being explained at a later point.

The magnetic structure is excited by means of a pair of series-connected coils 26 and 27 which surround pole pieces 14 and 15 and which may be energized in such a manner as to provide sinusoidal time-varying flux in the magnetic circuit. Electrons produced within envelope 10 are affected in two ways by the variations in magnetic flux thus obtained. In the first place, since the magnetic flux traversing core 13 links the circular path provided by envelope 10, any variation of such flux necessarily produces an eddy field tending to accelerate electrons projected along such path. In this latter respect, the apparatus is comparable to a transformer having a secondary winding comprising a circular path along which the various electrons are accelerated. In general, although the voltage per turn in such a transformer may be low, within a practically obtainable range of flux variation, the electrons can be made to achieve very high energies, e. g., several million electron volts, because of the tremendous number of turns which they may execute during a single cycle of magnetic flux variation. In addition to the acceleration produced by flux linking the electron path, the flux produced by annular pole faces 18 and 19 in the region of the electron orbit tends to cause the electrons to follow an inwardly spiraling path. It has been shown that by a proper design of the magnetic structure the centripetal force produced by the magnetic field existing at the electron orbit may be caused to balance the centrifugal tendencies of the accelerated electrons. In general, this requires that the following relationship be satisfied:

$$\Phi = 2\pi r_0^2 H_{r_0} \qquad (1)$$

where $\Phi$ is the flux included in the electron orbit, $r_0$ is the radius of the orbit, and $H_{r_0}$ is the field strength at the orbit. This equation indicates that the flux must be twice as strong as that which would be produced by a homogeneous field having an intensity $H_{r_0}$ and extending over the entire area enclosed by the orbital electron path. This condition may be realized by making the reluctance per unit of cross-sectional area of the magnetic path at the electron orbit greater by an appropriate amount than its average reluctance within the orbit. In order to maintain the desired proportionality between the enclosed flux and the guide field, i. e., the field $H_r$, at all times during an accelerating period, one may adjust the air gap existing between pole faces 18 and 19 and the insulation-filled gaps 21 and 22 to the appropriate value. It is readily practicable to control the dimensions of the gap from point to point over the pole faces in such a fashion as to effect the balanced relation of guide field and enclosed flux which is desired for the purpose specified above and which is further necessary for radial and axial stability of the electron orbit. This may be done, for example, by a construction such as that shown in Fig. 1 in which pole faces 18 and 19 are doubly tapered. In general, a satisfactory compromise between the demands of radial and axial stability of the electron orbit may be obtained by making $H_r$, the guide field intensity between pole faces 18 and 19, proportional to $$1/r^n \qquad (2)$$

where $n$, a local index, is between zero and one, such considerations being more fully described and set forth in U. S. Patent No. 2,394,070, granted February 5, 1946, to D. W. Kerst. A suitable field profile for radial and axial stability along appropriate radii in the plane of the orbit between pole faces 18 and 19 is shown by curve A in Fig. 2 wherein $\log_{10} r$ is plotted along a linear abscissa scale and $\log_{10} B$ (B is the magnetic induction and is related to $H_r$ through a permeability factor, $\mu$) is plotted along a linear ordinate scale. It will be readily appreciated that the slope of curve A at any point represents the value of the local index, $n$, at that point. Dotted lines B and C represent a value of $n$ of 1 and 2/3, respectively. An extractor device 28, shown schematically in Fig. 1, for directing the accelerated electrons from vessel 10 may be located in the region of line D within the $n=1$ region as will be more fully described hereinafter. Target 29, which may consist of a suitable material such as tungsten supported within envelope 10 as shown schematically in Fig. 1, may be located within the region of line E. The inner and outer edges of pole pieces 18 and 19 are represented by lines F and G, respectively.

When all the conditions specified in the foregoing are fulfilled, electrons introduced into vessel 10 in a period when the magnetic field is increasing may be expected to be drawn into the particular orbit in which a balance of centripetal and centrifugal forces exist and to be continuously accelerated along such orbit as long as the magnetic field increases in value. In Fig. 3, curve A may be considered to represent the time variations of magnetic field or alternatively the time variation of current in energizing windings 26 and 27. With this representation, electrons may be conveniently introduced into chamber 10 by energization of source 11, as will be more fully described hereinafter, at a time represented by line $a$. Assuming that the peak value of the magnetic field is sufficiently high, a total energy on the order of several million electron volts may be acquired by the accelerated electrons in a small fraction of a second.

It may be noted, however, that when an electron has obtained a velocity corresponding to an energy level of about two or three million electron volts, it is already within about three per cent of the velocity of light. Accordingly, further gain in energy results primarily in an increase in the mass of the affected electrons and only insignificantly in further gain in electron velocity, this result being consistent with the Einstein mass-energy equivalence formula. Accordingly, electrons which have obtained a velocity within a few per cent of the velocity of light will gyrate with a relatively constant periodicity or at a relatively fixed frequency, provided they can be confined to an orbit of relatively fixed radius. As is pointed out in the aforementioned Pollock and Westendorp Patent 2,485,409, this consideration makes it possible to impart further energy to the electrons by means of a localized electric field of fixed frequency acting repetitively on the electrons as they continue their gyrations within the envelope 10. A suitable device for obtaining a properly localized electric field of this nature may comprise a resonator structure 30, shown schematically in Figs. 4 and 8, which can be conveniently constructed as a sector of vessel 10. Various forms of resonator structure which may be advantageously adapted to such purposes are disclosed in the copending application Serial Number 691,293, filed August 17, 1946, now U. S. Patent 2,553,312, by Anatole M. Gurewitsch and assigned to the assignee of the present invention. By this means extremely high energy levels can be reached through a mechanism which avoids difficulties associated with any attempt to achieve corresponding energy levels by magnetic acceleration alone. With this in mind, the apparatus of Fig. 1 is so constructed that saturation of core 13 occurs after a sufficient acceleration of the electrons has been obtained by magnetic means, such as at a time indicated by line $b$ of Fig. 3, and then resonator 30 is brought into play at a time represented by line $c$ to produce a high frequency voltage represented by curve B. However, the guide field produced between pole faces 18 and 19 continues to increase as a result of continued energization of coils 26 and 27 in order that the accelerated electrons may still be confined to the desired orbit. When the electrons have reached a desired energy level at or before the magnetic field represented by curve A of Fig. 3 has reached its maximum value, e. g., such as the time indicated by line $d$ of Fig. 3, resonator 30 may be deenergized whereby, since the force of the localized electric field tending to impart further energy to the electrons has been removed, subsequent increase of the guide field will cause the electrons to spiral inwardly where they may strike target 29 of Fig. 1. If it is desired, however, resonator 30 need not be deenergized until after the magnetic field has passed over its maximum value. Thus, resonator 30 may be deenergized at a time indicated by line $e$ of Fig. 3 whereby, since the guide field decreases after the force of the localized electric field has been removed, the electrons will spiral outwardly. Such an expedient is necessary in the attainment of some of the objects of the present invention, as will appear presently.

The operational correlation of the apparatus hereinbefore described may best be understood by reference to Fig. 4 which shows diagrammatically the accelerating structure as a whole in combination with schematically illustrated excitation equipment. In this figure, parts which have been described heretofore bear reference characters corresponding to those by which they have already been identified.

Referring particularly to Fig. 4, there is shown a power source 31 adapted to supply excitation voltage of the desired frequency, e. g., 60 cycles, to windings 26 and 27 by which the magnetic system of the accelerator is energized. A bank of capacitors represented by capacitors 32 may be connected as illustrated between source 31 and windings 26 and 27 for the purpose of power factor correction. A second power source 33, which is assumed to be appropriately connected to charged particular or electron source 11 of Fig. 1, and which may be an intermittently energized circuit of the type described in the Pollock and Westendorp Patent 2,485,409, serves to inject electrons into vessel 10 at appropriate intervals correlated with the cyclical reversals of the magnetic field as heretofore mentioned. This correlation may be obtained by means of a saturable strip 34 which saturates at a desired time and causes a triggering voltage to be induced in a winding 35 connected to source 33. A high frequency power source 36, which may consist, for example, of an electronic oscillator, when energized supplies high frequency potential through transmission line conductors 37 and 38 to resonator 30. Means for initiating the energization of source 36 may comprise a saturable strip 39 with an associated winding 40 connected to a grid controlled gaseous discharge tube switch 41, such as that described in the aforementioned Pollock and Westendorp Patent 2,485,409.

In order to deenergize source 36 after the electrons have been accelerated for a desired time, a voltage, in proper time phase with the voltage of source 31 and derived through a phase shifter 42 connected to source 31, may be applied to discharge tube switch 41. The electrons may then be ejected from the accelerator apparatus by directing them into and through an electric field supplied by extractor device 28, shown schematically in Fig. 1. This electric field may be supplied by a high voltage transformer 43, one end of the secondary winding 43' of which is connected through a conductor 44 into a side arm 45 in envelope 10 which supports extractor device 28. The other end of secondary winding 43' is connected to ground as shown. The primary winding 46 of high voltage transformer 43 is connected through a phase shifter 47 to source 31 in order that the electric field through which the electrons are directed for ejection from the accelerator apparatus may at all times have an intensity proportional to the intensity of the magnetic guide field.

Heretofore, it has been considered that operation of apparatus such as that hereinbefore described would prevent the successful extraction of a collimated beam of accelerated electrons. This belief has arisen from the fact that, since the electrons are accelerated in a stable orbit closely confined by the vertical and radial restoring forces hereinbefore discussed, they could only be ejected by destroying the so-called "betatron" relationship of Equation 1 or by destroying the relationship between the accelerating force applied by high frequency resonator 30 and the magnetic guide field. If either such expedient is employed, it will be readily appreciated that the electrons will not emerge from the stable orbit at one particular point along the circumference thereof but instead will have a great number of points of emergence spatially distributed around the circumference of the stable orbit. This effect is similar to the effect one would expect when water is placed upon the circumference of a rotating wheel. Consequently, it may be seen that a collimated beam of electrons may not be ejected from such accelerator apparatus without additional considerations. According to the present invention, highly efficient collimation and ejection of the accelerated electrons are facilitated by the employment of the hereinbefore mentioned extractor device 28.

Referring particularly now to Figs. 5, 6 and 7, wherein portions shown before are identified by identical reference characters, there is shown in detail the extractor device 28 disposed within the interior of envelope 10. Extractor device 28 comprises a pair of spaced apart curved support members 48 and 49 attached to C-shaped frame members 50, 51, 50' and 51' by any means such as soldering. Extending across the inner edges of and between support members 48 and 49 is an electrode 52 which may consist of a thin strip of nonmagnetic material, e. g., molybdenum about 0.002" thick, lapped over and secured to support members 48 and 49 by any convenient means such as spot welding. Electrode 52 may be maintained at ground potential by connecting to it a suitable conductor (not shown) introduced through a side arm into envelope 10 in a manner well known to those skilled in the art. Opposed to and radially spaced from electrode 52 is a curved T-shaped high voltage electrode 53 supported from C-shaped frame members 50' and 51' by means of insulators 54 and 55. Insulators 54 and 55 may comprise conductive stems 56 and 57 supported with adjacent ends spaced apart by means of an insulating spacer member 58. For the purpose of reducing the likelihood of sparkover between high voltage electrode 53 and the C-shaped support members which are grounded, shielding cups 59 and 60 are provided at the lower and upper ends of insulating spacer 58 respectively. Conductors 56 and 57 may be attached to the C-shaped support members and high voltage electrode 53, respectively, by any convenient means such as soldering. In order to provide support and accurate desired radial positioning of structure 28, end studs 61 and 62 are attached, such as by soldering, to the respective ends of curved support members 48 and 49. The outer ends of studs 61 and 62 bear against the inner periphery of envelope 10 and are curved to conform generally thereto. The portions of studs 61 and 62 which traverse the radially extending space between electrodes 52 and 53 are provided with openings 63 and 64 to permit accelerated electrons to enter and emerge from structure 28, as will be more fully described hereinafter. For the purpose of conducting high voltage to electrode 53 and also for the purpose of providing support for structure 28, conductor 44, in the portion entering envelope 10 shown in Fig. 5, may comprise a rigid conductive rod having a diametrically extending slot 65 in its inner end which makes a press fit with electrode 53. Conductor 44 may be sealed within side arm 45 in a manner well known to those skilled in the art.

In view of the foregoing, it will be readily understood how a beam of high energy electrons may be successfully ejected from the accelerator apparatus. Let use assume that electrons have been injected from source 11 and accelerated as hereinbefore described, the direction of travel of such electrons being counterclockwise along the stable orbit as indicated in Fig. 5. If, by a properly timed voltage correlated with source 31 of Fig. 4 and supplied through phase shifter 42 to discharge tube switch 41, source 36 is then de-energized after the maximum of the magnetic field represented by curve A of Fig. 3 has been reached, the electrons will spiral outwardly toward ejector structure 28 because the magnetic guide field decreases with time after the accelerating force of source 36 has been removed. As the electrons continue to spiral outwardly, they reach ejector structure 28, pass through opening 64, and traverse the electric field between electrodes 52 and 53. It will be apparent that, if the potential applied to electrode 53 is positive with respect to the ground potential of electrode 52, the electrons will be attracted toward electrode 53 and hence the pitch of the spiral paths, followed by the electrons before they entered structure 28, will be increased. Thus, by the proper application of an electric field, the electrons may be caused to emerge from opening 63 with a trajectory which directs them from envelope 10 shortly thereafter.

In order to secure successful ejection of the electrons with maximum efficiency, there are several important considerations which must be observed. In the first place, extractor device 28 must have the proper radial disposition within envelope 10 so that it may properly intercept the spiraling electrons. As has been mentioned heretofore in connection with Equation 2 and Fig. 2, the electrons traverse an axially and radially stable orbital path when the local index, $n$, is between 0 and 1. However, when the local index, $n$, is equal to or exceeds 1 in value, the electrons are radially unstable inasmuch as the radial restoring forces produced by the guide field $H_r$ are insufficient to keep the electrons within a defined stable orbit. Therefore, it is desirable to position extractor device 28 within the $n=1$ region, as indicated in Fig. 2, in order to take advantage of the radial instability of the electrons within that region and thereby enhance the effectiveness with which the electric field appearing between electrodes 52 and 53 may increase the pitch of the spiral paths followed by the electrons. It may also be shown that the following relation must be observed:

$$e = \frac{H_{r_{n=1}} r_{n=1}}{H_e - E} \quad (3)$$

where $e$ is the radius of curvature of the extractor, $H_{r_{n=1}}$ is the magnetic field intensity where $n=1$, $r_{n=1}$ is the radius where $n=1$, $H_e$ is the magnetic field intensity at a point between electrodes 52 and 53, and E is the electric field intensity between electrodes 52 and 53. This relation means that the radius of curvature of the extractor device 28 must be somewhat larger than the radius of the $n=1$ region. It has been found that ordinarily E is of the order of 10% of H and, therefore, $e$ must be proportionally larger than $r_n$ to maintain the above relation. Commonly, ejector structure 28 is arranged so that the portion of electrode 52 adjacent opening 64 lies approximately on the radially inward edge of the $n=1$ region indicated in Fig. 2.

Equation 3 also shows the dependency between the electric field intensity E and the intensity of the magnetic field. If the electrons are to be successfully ejected at any desired energy level, therefore, the intensity of the electric field E must be correlated with the intensity of the magnetic guide field $H_r$ at the time the electrons enter the ejector structure 28 in such a manner as to maintain Equation 3. This is accomplished according to the present invention as explained in conjunction with Fig. 4 by connecting conductor 44 so as to provide a high voltage to electrode 53 which is dependent in time upon the voltage of source 41. The field E thus supplied between electrodes 52 and 53 is not strictly electrostatic according to common terminology since it varies in time, but, insofar as the electrons are concerned, they experience essentially the force of an electrostatic field because they are spiraling with a velocity approximately that of light, and hence any variations in time of the field E while the electrons are traversing it are so small as to be insignificant. Therefore, the term "essentially electrostatic" may be employed as descriptive of the field E.

In Fig. 8, there is shown a view which illustrates in schematic fashion a disposition of the various portions of the apparatus hereinbefore described which may be suitably employed in connection with the present invention. Electron source 11 may be positioned above or below the plane of the electron orbit and within the region where $n$ is between 0 and 1 in order that electrons injected into the apparatus may not strike the extractor device 28 prematurely. Instead of being supported by means of a side arm 12, as shown, electron source 11 may with efficacy be supported above or below the plane of the orbit by attaching it through insulators (not shown) to extractor device 28. Extractor device 28 is positioned with its leading edge (adjacent opening 64) approximately at the inward radial edge of the $n=1$ region with a magnetic guide field having a general configuration similar to that illustrated in Fig. 2. Stud 62 is of such a length as to assure this positioning while stud 61 is of such a length as to bring the lagging edge of extractor device 28 (adjacent opening 63) to a somewhat larger radius. With the proper electric field intensity between electrodes 52 and 53 and with a desired azimuthal positioning of extractor device 28 as indicated, the electrons, spiraling outward after resonator 30 has been deenergized to enter extractor device 28, may be expected to have the pitch of the spiral paths, which they had followed therebefore, increased in such a manner as to cause them to emerge from the envelope 10 as illustrated by lines 66. In order to permit efficient emergence of the electrons from the envelope 10, there is provided a circumferential port 67 having a terminating electron permeable window 68 secured thereto in a manner well known to those skilled in the art. The accelerator apparatus may also be employed in accordance with the invention to generate high energy X-rays by positioning X-ray target 29 along a smaller radius than the radius of the stable orbit and deenergizing resonator 30 in a particular cycle of magnetic field before the magnetic field has reached a maximum value. Thereupon the electrons spiral inwardly, strike X-ray target 29, and emerge through window 68 as illustrated by lines 69.

The curves shown in Fig. 9 illustrate how the azimuthal emergence of the electrons from envelope 10 may be affected by the magnitude of the voltage applied between electrodes 52 and 53 as well as by the radial position of extractor device 28. In Fig. 9, the abscissas of the graph represent the perpendicular distance of the maximum electron beam intensity from the inner side of leg 70 (Fig. 8) which is a portion of magnetic structure 20. The ordinates of the graph represent the voltage applied between extractor electrodes 52 and 53 or the "extractor" voltage. Curve A shows the variation of maximum beam intensity with extractor voltage when the leading edge of extractor device 28 (adjacent opening 64) is positioned at the innermost edge of the $n=1$ region so that extractor device 28 would be, except for its slighter larger curvature, positioned with electrode 52 lying along the innermost radius of the $n=1$ region. Curve B represents the variation of maximum beam intensity with extractor voltage when extractor device 28 is positioned as in curve A except the whole extractor device is at a slightly larger radius. Curve C represents the same variation when extractor device 28 is positioned as in curve A except that the lagging edge (adjacent opening 63) is tilted outward slightly. These curves clearly illustrate that the pitch of the spiral paths followed by the electrons may be readily increased by increasing the voltage between electrodes 52 and 53. Also, the pitch may be increased by tilting the lagging end of the extractor device slightly outward. Moreover, as curve B indicates, with extractor device 28 at a radius slightly larger than the innermost radius of the $n=1$ region, effective extraction may be obtained. However, it has been found that, with the extractor device at a slightly smaller radius than the innermost radius of the $n=1$ region, i. e., where $n$ is between 0 and 1, suitable extraction cannot be obtained.

In Fig. 10, there is shown alternative circuitry for assuring that the voltage applied between electrodes 52 and 53 is in proper time relation with the variations of the hereinbefore mentioned magnetic field. It may be observed that the current in series-connected windings 26 and 27, which excite magnetic structure 20, is proportional to the variations of magnetic field. Hence, the desired variable voltage between electrodes 52 and 53 may be obtained by means of a current transformer 71 connected in circuit with windings 26 and 27 to supply a step-up high voltage transformer 72 and conductor 44 which is connected to electrode 53. The primary winding of current transformer 71 may comprise the conductor 73 interconnecting windings 26 and 27 and capacitor 32, while the secondary winding 74 of transformer 71 may comprise a few turns positioned about conductor 73. Since electrode 52 is grounded, the high voltage end of secondary winding 75 of transformer 72 may be connected through conductor 44 to electrode 53, while the other end of winding 75 may be connected directly to ground as indicated. To secure the proper phasing of the voltage between electrodes 52 and 53 with respect to the varying magnetic field, there is provided a variable capacitor 76 connected across the primary winding 77 of transformer 72. The magnitude of the voltage applied between electrodes 52 and 53 may be adjusted by means of a variable resistor 78 connected in parallel with variable capacitor 76 and primary winding 77 of transformer 72. In some instances, in order to secure the proper phasing as hereinbefore mentioned, it may be found necessary to replace variable capacitor 76 with a variable inductor (not shown).

It is also within contemplation of the present invention that the voltage applied between electrodes 52 and 53 may be in the form of a pulse having a desired magnitude proportional to the intensity of the magnetic guide field at the time it is applied. Suitable circuitry for accomplishing such a purpose is shown in Fig. 11 wherein elements already shown and described bear corresponding reference characters. Pulses of the desired nature may be obtained by charging a capacitor 79 to a voltage proportional to the intensity of the magnetic guide field and discharging such capacitor through a grid-controlled gaseous discharge device 80 and a resistor 81. Means for so charging capacitor 79 comprise an auto-transformer 82 for determining the magnitude of the pulse connected across source 31 as indicated. The movable contact 83 of autotransformer 82 is connected to the primary winding 84 of a high voltage step-up transformer 85. One end of the secondary winding 86 of transformer 85 is connected to ground while the other end is connected to the plate 87 of a diode rectifier device 88. The filament 89 of rectifier device 88 is connected through a current-limiting resistor 90 to capacitor 79 and the plate 91 of discharge device 80. Since source 31 energizes windings 26 and 27, which in turn excite magnetic structure 20 to provide for the magnetic field within the accelerator structure, it may be seen that the capacitor 79 is charged to a potential proportional to the intensity of the magnetic guide field. Resistor 81 is grounded, as shown, to complete the charging circuit from secondary winding 86 of transformer 85 through rectifier device 88, resistor 90, capacitor 79 and resistor 81. In order to provide a desired bias for discharge device 80, there is shown a source of direct current potential 92 connected in series with a grid leak resistor 93 between the grid 94 and filament 95 of discharge device 80. Means for triggering device 80 at a desired time to discharge capacitor 79 may comprise a saturable strip 96 disposed between pole pieces 14 and 15 and having a winding 97 inductively linked thereto. One end of winding 97 is connected through a capacitor 98 to grid 94 of discharge device 80 while the other end is connected to ground. The time at which strip 96 saturates to cause a voltage pulse to be generated in winding 97 for triggering discharge device 80 may be controlled by current carrying winding 99 connected in series with a source of direct current potential 100, a variable resistor 101 and a reactor 102. Winding 99 is inductively linked with saturable strip 96 and thus may be employed to determine the time at which strip 96 saturates. Variable resistor 101 has the function of limiting the direct current flowing through winding 99 while reactor 102 prevents winding 99 from loading winding 97 when a voltage is generated therein by the saturation of strip 96. As will now be readily understood, discharge device 80 may be triggered by a voltage supplied from winding 97 at a desired time whereby capacitor 79 will discharge through resistor 81. This causes a voltage to appear across resistor 81 and, if electrode 53 is connected through conductor 44 to resistor 81 as indicated, a voltage pulse which has a magnitude proportional to the intensity of the magnetic field and which may be arranged to occur at a desired time in the cycle of magnetic field is applied between electrodes 52 and 53.

In Figs. 12 and 13, there is shown alternative structure for an extractor device. Herein extractor device 128 comprises a curved member 103 of insulating material having a longitudinal channel 104 within which a high voltage electrode 153 is disposed. High voltage electrode 153 is supported within channel 104 by means of a conductor 144 which extends through a hole in member 103 and screws into a nut 105 attached to electrode 153 by any means such as soldering. A shoulder 106 may be provided on conductor 144 for determining the proper radial position of high voltage electrode 153 within channel 104. Electrode 152, which may be maintained at ground potential by means of a conductor (not shown) connected thereto and introduced through a side arm in envelope 110, is supported traversing the open side of channel 104 by means of thin wires 107 which extend around member 103 to be attached at both ends to electrode 52 by any convenient means such as spot welding. An end plate 108, having an opening 109 therein to permit the entrance of electrons into extractor device 128, may be attached to member 103 by means of screws 110. Shoulders 111 and 112 may be provided at the respective ends of member 103 for the purpose of bearing against envelope 110 to secure the proper radial positioning of structure 28.

As has been mentioned heretofore in connection with Fig. 5, electrode 52 should consist of a thin strip of nonmagnetic material, e. g., molybdenum about 0.002" thick. Electrode 52 should be as thin as permissible in view of structural limitations in order to keep the electrons from striking the leading edge of electrode 52 during extraction. Moreover, all of the metallic material utilized within extractor device 28 should be nonmagnetic, e. g., molybdenum or stainless steel, etc., so that eddy currents induced by the changing magnetic field may be minimized. The radial spacing between high voltage electrode 53 and electrode 52 should be greater than the spacing between successive orbits of the electrons within the region where extractor device is positioned, but yet not great enough to prevent the establishment of the required high voltage gradient. Any soldering employed in connection with the construction of extractor device 28 should utilize a high melting point solder in order to obviate destruction of the joints by heating due to eddy currents.

While my invention has been described by reference to particular embodiments thereof, alternative constructions will readily occur to those skilled in the art. I, therefore, aim in the appended claims to cover all such equivalent embodiments as may be within the true spirit and scope of the foregoing description.

What I claim as new and desire to secure by Letters Patent of the United States is:

1. A system for producing a beam of high energy electrons comprising magnetic induction accelerator means for accelerating electrons in an orbital path including means providing an alternating magnetic flux which links said path to accelerate said electrons and means providing an alternating magnetic guide field which traverses said path to constrain said electrons thereto, high frequency electrodes for imparting further energy to said electrons in said orbital path after acceleration to approximately the velocity of light by said alternating flux, oscillator means for energizing said electrodes in timed correlation with said alternating field, means for deenergizing said oscillator means and said electrodes in timed correlation with said alternating field whereby said electrons may be diverted from said orbital path into spiral paths, and spaced extractor electrodes adjacent said orbital path for increasing the pitch of said spiral electron paths, at least one of said extractor electrodes being connected to an alternating voltage source.

2. A system for producing a beam of high energy electrons comprising magnetic induction accelerator means for accelerating electrons in an orbital path including means providing an alternating magnetic flux which links said path to accelerate said electrons and means providing an alternating magnetic guide field which traverses said path to constrain said electrons thereto, high frequency electrodes for imparting further energy to said electrons in said orbital path after acceleration to approximately the velocity of light by said alternating flux, oscillator means for energizing said electrodes in timed correlation with said alternating field, means for deenergizing said oscillator means and said electrodes in timed correlation with said alternating field whereby said electrons may be diverted from said orbital path into spiral paths, and spaced extractor electrodes adjacent said orbital path for increasing the pitch of said spiral electron paths, at least one of said extractor electrodes being connected to an alternating voltage source having a time phase correlated with said alternating magnetic guide field.

3. A system for producing a beam of high energy electrons comprising magnetic induction accelerator means for accelerating electrons in an orbital path including means providing an alternating magnetic flux which links said path to accelerate said electrons and means providing an alternating magnetic guide field which traverses said path to constrain said electrons thereto, high frequency electrodes for imparting further energy to said electrons in said orbital path after acceleration to approximately the velocity of light by said alternating flux, oscillator means for energizing said electrodes in timed correlation with said alternating field, means for deenergizing said oscillator means and said electrodes in time correlation with said alternating field whereby said electrons may be diverted from said orbital path into spiral paths, and spaced extractor electrodes adjacent said orbital path for increasing the pitch of said spiral electron paths, at least one of said extractor electrodes being connected to a source of voltage pulses correlated in time and amplitude with said alternating magnetic field.

4. A system for producing a beam of high energy electrons comprising magnetic induction accelerator means for accelerating electrons in an orbital path including means providing an alternating magnetic flux which links said path to accelerate said electrons and means providing an alternating magnetic guide field which traverses said path to constrain said electrons thereto, high frequency electrodes for imparting further energy to said electrons in said orbital path after acceleration to approximately the velocity of light by said alternating flux, oscillator means for energizing said electrodes in timed correlation with said alternating field, means for deenergizing said oscillator means and said electrodes in timed correlation with said alternating field whereby said electrons may be diverted from said orbital path into spiral paths, and electric field producing means for ejecting said electrons from said orbital path, said last-named means being in timed correlation with said alternating magnetic field to produce an electric field having an amplitude and phase dependent upon the variations of said alternating magnetic field.

5. Electron accelerator apparatus comprising means for accelerating electrons in a stable orbital path including means providing an alternating magnetic flux which links said path to accelerate said electrons and means providing an alternating magnetic guide field which traverses said path to constrain said electrons thereto, said last-named means being arranged to satisfy the proportionality $$H_r \propto \frac{1}{r^n}$$

where $H_r$ is the field strength of said magnetic guide field, $r$ is the radius at which $H_r$ is measured, and $n$ is an exponent having a value between 0 and 1 in the stable orbit region, high frequency electrodes coupled to said path for imparting further energy to said electrons, a source of high frequency oscillations connected to said electrodes, a discharge tube switch connected to energize said source at a predetermined time and to deenergize said source when said electrons have been accelerated to a desired energy level whereby said electrons will be diverted from said stable orbit into spiral paths, and spaced extractor electrodes positioned adjacent said orbital path to provide an azimuthal essentially electrostatic field which said spiraling electrons will traverse, one of said electrodes having its leading edge positioned within a region of alternating magnetic field where $n=1$ and another of said electrodes being connected to a source of high voltage correlated in time with the variations of said alternating magnetic field.

6. A system for producing a beam of high energy charged particles comprising magnetic induction accelerator means for accelerating charged particles in an orbital path including means providing a time-varying magnetic flux which links said path to accelerate said charged particles and means providing a time-varying magnetic guide field which traverses said path to constrain said charged particles thereto, high frequency electrodes for imparting further energy to said charged particles in said orbital path after acceleration to a desired velocity by said time-varying flux, oscillator means for energizing said electrodes in timed correlation with said time-varying field, means for diverting said charged particles from said orbital path into spiral paths, and spaced extractor electrodes adjacent said orbital path for increasing the pitch of said spiral charged particle paths, at least one of said extractor electrodes being connected to a source of time-varying voltage.

7. A system for producing a beam of high energy charged particles comprising magnetic induction accelerator means for accelerating charged particles in an orbital path including means providing a time-varying magnetic flux which links said path to accelerate said charged particles and means providing a time-varying magnetic guide field which traverses said path to constrain said charged particles thereto, high frequency electrodes for imparting further energy to said charged particles in said orbital path after acceleration to a desired velocity by said time-varying flux, oscillator means for energizing said electrodes in timed correlation with said time-varying magnetic field, means for diverting said charged particles from said orbital path into spiral paths, and electric field producing means for ejecting said charged particles from said orbital path, said last-named means being in timed correlation with said time-varying magnetic field to produce an electric field having an amplitude and phase dependent upon the variations of said time-varying magnetic field.

8. Charged particle accelerator apparatus comprising means for accelerating charged particles in a stable orbital path including means providing a time-varying magnetic flux which links said path to accelerate said charged particles and means providing a time-varying magnetic guide field which traverses said path to constrain said charged particles thereto, said last-named means being arranged to satisfy the proportionality.

$$H_r \propto \frac{1}{r^n}$$

where $H_r$ is the field strength of said magnetic guide field, $r$ is the radius at which $H_r$ is measured, and $n$ is an exponent having a value between 0 and 1 in the stable orbit region, high frequency electrodes coupled to said path for imparting further energy to said charged particles, a source of high frequency oscillations connected to said electrodes, means for diverting said charged particles from said stable orbital path into spiral paths after said charged particles have been accelerated to a desired velocity, and spaced extractor electrodes positioned adjacent said path to provide an azimuthal essentially electrostatic field which said spiraling charged particles traverse, one of said electrodes having its leading edge positioned within a region of time-varying magnetic field where $n=1$ and another of said electrodes being connected to a source of high voltage correlated in time with the variations of said time-varying magnetic field.

9. Charged particle accelerator apparatus comprising means for accelerating charged particles in a stable orbital path including means providing a time-varying magnetic flux which links said path to accelerate said charged particles and means providing a time-varying magnetic guide field which traverses said path to constrain said charged particles thereto, said last-named means being arranged to satisfy the proportionality $$H_r \propto \frac{1}{r^n}$$

where $H_r$ is the field strength of said magnetic guide field, $r$ is the radius at which $H_r$ is measured, and $n$ is an exponent having a value between 0 and 1 in the stable orbit region, high frequency electrodes coupled to said path for imparting further energy to said charged particles, a source of high frequency oscillations connected to said electrodes, means for diverting said charged particles from said stable orbital path into spiral paths after said charged particles have been accelerated to a desired velocity, and spaced extractor electrodes positioned adjacent said path to provide an azimuthal essentially electrostatic field which said spiraling charged particles will traverse, one of said extractor electrodes having its leading edge positioned within a region of time-varying magnetic field where $n$ is slightly less than 1 and another of said electrodes being connected to a source of high voltage correlated in time with the variations of said time-varying magnetic field.

10. A system for producing a beam of high energy charged particles comprising magnetic induction accelerator means for accelerating charged particles in an orbital path including means providing a time-varying magnetic flux which links said path to accelerate said charged particles and means providing a time-varying magnetic guide field which traverses said path to constrain said charged particles thereto, means for diverting said charged particles from said orbital path into spiral paths, and spaced extractor electrodes adjacent said orbital path for increasing the pitch of said spiral charged particle paths, at least one of said extractor electrodes being connected to a source of time-varying voltage.

HERBERT C. POLLOCK.

References Cited in the file of this patent

UNITED STATES PATENTS

| Number | Name | Date |
|---|---|---|
| 1,948,384 | Lawrence | Feb. 20, 1934 |
| 2,193,602 | Penney | Mar. 12, 1940 |
| 2,394,070 | Kerst | Feb. 5, 1946 |
| 2,533,859 | Wideroe | Dec. 12, 1950 |
| 2,553,305 | Dickinson | May 15, 1951 |
| 2,553,312 | Gurewitsch | May 15, 1951 |

OTHER REFERENCES

Review of Scientific Instruments "Design Study for a Ten-Bev. Magnetic Accelerator," Brobeck, vol. 19, No. 9, September 1948, pages 545–551.